(12) United States Patent
Tateishi et al.

(10) Patent No.: US 10,480,949 B2
(45) Date of Patent: Nov. 19, 2019

(54) APPARATUS FOR IDENTIFYING POSITION OF OWN VEHICLE AND METHOD FOR IDENTIFYING POSITION OF OWN VEHICLE

(71) Applicant: DENSO CORPORATION, Kariya, Aichi-pref. (JP)

(72) Inventors: Kojiro Tateishi, Nishio (JP); Shunsuke Suzuki, Kariya (JP); Hiroshi Mizuno, Kariya (JP); Naoki Kawasaki, Nishio (JP); Takeshi Shikimachi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 240 days.

(21) Appl. No.: 15/611,571

(22) Filed: Jun. 1, 2017

(65) Prior Publication Data
US 2017/0350712 A1    Dec. 7, 2017

(30) Foreign Application Priority Data

Jun. 3, 2016 (JP) ................................. 2016-111721

(51) Int. Cl.
*G01C 21/30* (2006.01)
*G01S 5/14* (2006.01)
(Continued)

(52) U.S. Cl.
CPC ......... *G01C 21/30* (2013.01); *G01C 21/3602* (2013.01); *G01S 5/14* (2013.01); *G01S 7/4808* (2013.01); *G01S 13/89* (2013.01); *G01S 13/931* (2013.01); *G01S 17/89* (2013.01); *G01S 17/936* (2013.01); *G01S 19/48* (2013.01); *G06K 9/00805* (2013.01); *G06K 9/00818* (2013.01);
(Continued)

(58) Field of Classification Search
CPC . G01C 21/30; G01S 19/48; G01S 5/14; G01S 13/89; G08G 1/00
See application file for complete search history.

(56) References Cited

U.S. PATENT DOCUMENTS 5,739,848 A * 4/1998 Shimoura ............ G05D 1/0246
                                                                348/119
5,848,374 A * 12/1998 Wakabayashi ......... G01C 15/00
                                                                701/455

(Continued)

*Primary Examiner* — Ramsey Refai
(74) *Attorney, Agent, or Firm* — Knobbe, Martens, Olson & Bear, LLP

(57) ABSTRACT

A position identifying apparatus includes a position detecting unit; an information acquiring unit; a feature extracting unit; an index value calculating unit; a feature selecting unit; a correlating unit; a weight setting unit; and a correcting unit. The position detecting unit performs a map matching to detect a vehicle position on a map. The information acquiring unit acquires road information from the map. The feature extracting unit extracts features of a ground object. The index value calculating unit calculates an index value representing a likelihood of a stationary object. The feature selecting unit selects feature candidates among the features having the index values larger than or equal to a predetermined likelihood of the stationary object. The correlating unit correlates the feature candidates with the road information. The weight setting unit sets weights of the feature candidates. The correcting unit corrects the position of the vehicle using the weights.

7 Claims, 11 Drawing Sheets

(51) Int. Cl.
*G01S 13/89* (2006.01)
*G01S 19/48* (2010.01)
*G01C 21/36* (2006.01)
*G01S 17/89* (2006.01)
*G01S 17/93* (2006.01)
*G01S 7/48* (2006.01)
*G01S 13/93* (2006.01)
*G06K 9/00* (2006.01)
*G08G 1/0962* (2006.01)
*G08G 1/16* (2006.01)
*G06K 9/62* (2006.01)
*G08G 1/00* (2006.01)

(52) U.S. Cl.
CPC ....... *G06K 9/6215* (2013.01); *G08G 1/09626* (2013.01); *G08G 1/165* (2013.01); *G08G 1/00* (2013.01)

(56) References Cited

U.S. PATENT DOCUMENTS

| | | | | |
|---|---|---|---|---|
| 5,999,878 | A * | 12/1999 | Hanson | G01C 7/04 342/357.31 |
| 6,526,352 | B1 * | 2/2003 | Breed | G01C 21/3697 342/357.31 |
| 6,560,529 | B1 * | 5/2003 | Janssen | G01C 21/28 340/988 |
| 7,840,326 | B1 * | 11/2010 | Yamada | B60Q 1/085 701/472 |
| 8,370,028 | B2 * | 2/2013 | Yamada | B60Q 1/085 340/988 |
| 8,442,791 | B2 * | 5/2013 | Stahlin | G01C 21/30 340/995.25 |
| 9,342,888 | B2 * | 5/2016 | Menashe | G06K 9/00664 |
| 10,145,692 | B2 * | 12/2018 | Okuyama | G08G 1/0969 |
| 2001/0055063 | A1 | 12/2001 | Nagai et al. | |
| 2012/0179358 | A1 * | 7/2012 | Chang | G01C 21/32 701/119 |
| 2018/0209795 | A1 * | 7/2018 | Okuyama | G08G 1/0969 |

\* cited by examiner

APPARATUS FOR IDENTIFYING POSITION OF OWN VEHICLE AND METHOD FOR IDENTIFYING POSITION OF OWN VEHICLE

CROSS-REFERENCE TO RELATED APPLICATION

This application is based on and claims the benefit of priority from earlier Japanese Patent Application No. 2016-111721 filed Jun. 3, 2016, the description of which is incorporated herein by reference.

BACKGROUND

Technical Field

The present disclosure relates to an apparatus for identifying a position of an own vehicle on the map and a method for identifying the same.

Description of Related Art

An apparatus for identifying a position of an own vehicle has been known. In the apparatus, the position of the own vehicle on the map is corrected based on a white lane marking or a road-side wall existing around the own vehicle. For example, the apparatus includes a map that records a position of the road, and a position of the road-side wall existing in the vicinity of the road. In the case where the road-side wall is detected when the vehicle is running, the position of the own vehicle is corrected based on the position of the road-side wall recorded in the map.

According to patent document JP-A-2011-022157, an apparatus is disclosed in which a position of the feature existing in the vicinity of a travelling road is recorded in advance, and when the recorded feature is detected, the position of a mobile object is detected in accordance with the position of the recorded feature.

Many vehicles and signboards are present on a road where the vehicle runs, and those vehicles and the signboards are not recorded in the map. Hence, an apparatus that identifies the position of the own vehicle may cause erroneous detection of those vehicles and signboards as a recorded feature in the map. For example, when positions of white lane markings and curb stones are recorded on the map, and a vehicle or the like is stopped at a road shoulder, the apparatus may erroneously detect a contour of the vehicle as a part of a feature recorded in the map. On the other hand, in the case where the apparatus does not appropriately determine whether or not the feature should be used for the correction, the number of features may become insufficient so that the position of the own vehicle cannot be corrected accurately.

SUMMARY

The present disclosure provides a position identifying apparatus capable of accurately correcting a position of an own vehicle, and a position identifying method.

An embodiment provides a position identifying apparatus including: a position detecting unit that detects a position of an own vehicle on a map by using a map matching process; an information acquiring unit that acquires, from the map, road information surrounding the own vehicle based on the position of the own vehicle detected by the position detecting unit; a feature extracting unit that extracts features of ground object existing around the own vehicle, based on an output of a feature detecting unit mounted on the own vehicle; an index value calculating unit that calculates an index value representing a likelihood of a stationary object for the features extracted by the feature extracting unit; a feature selecting unit that selects feature candidates from among the features having the index value larger than or equal to a predetermined likelihood of the stationary object, a correlating unit that correlates the feature candidates with the road information acquired by the information acquiring unit; a weight setting unit that sets weights for feature candidates correlated with the road information, the weight being used for correcting the position of the own vehicle; and a correcting unit that corrects the position of the own vehicle using the weights.

Features existing in the vicinity of the road includes objects which move and objects which do not move. The former one is considered to be registered in the road information and the latter one is not considered to be registered in the road information. The features accompanying no movement have large likelihood of being a stationary object, and the features accompanying movement have small likelihood of being a stationary object. According to the above-mentioned configuration, among features extracted on the basis of the output of a feature detecting unit such as camera unit, features having the index value larger than or equal to a predetermined likelihood of the stationary object are selected as feature candidates. The feature candidates and the road information are correlated to each other, whereby weights are set for the feature candidates for correcting the own vehicle position. Then, the own vehicle position is corrected by using the weight of the feature candidates. In this case, the weights are applied to detected features existing around the own vehicle, considering likelihood of the stationary objects. Accordingly, the position identifying apparatus uses objects, which will potentially move with high probability, for positional correction of the own vehicle, thereby reducing a decrease of the correction accuracy. As a result, suitable positional correction of the own vehicle can be performed.

DETAILED DESCRIPTION OF THE PREFERRED EMBODIMENTS

Figure 1:
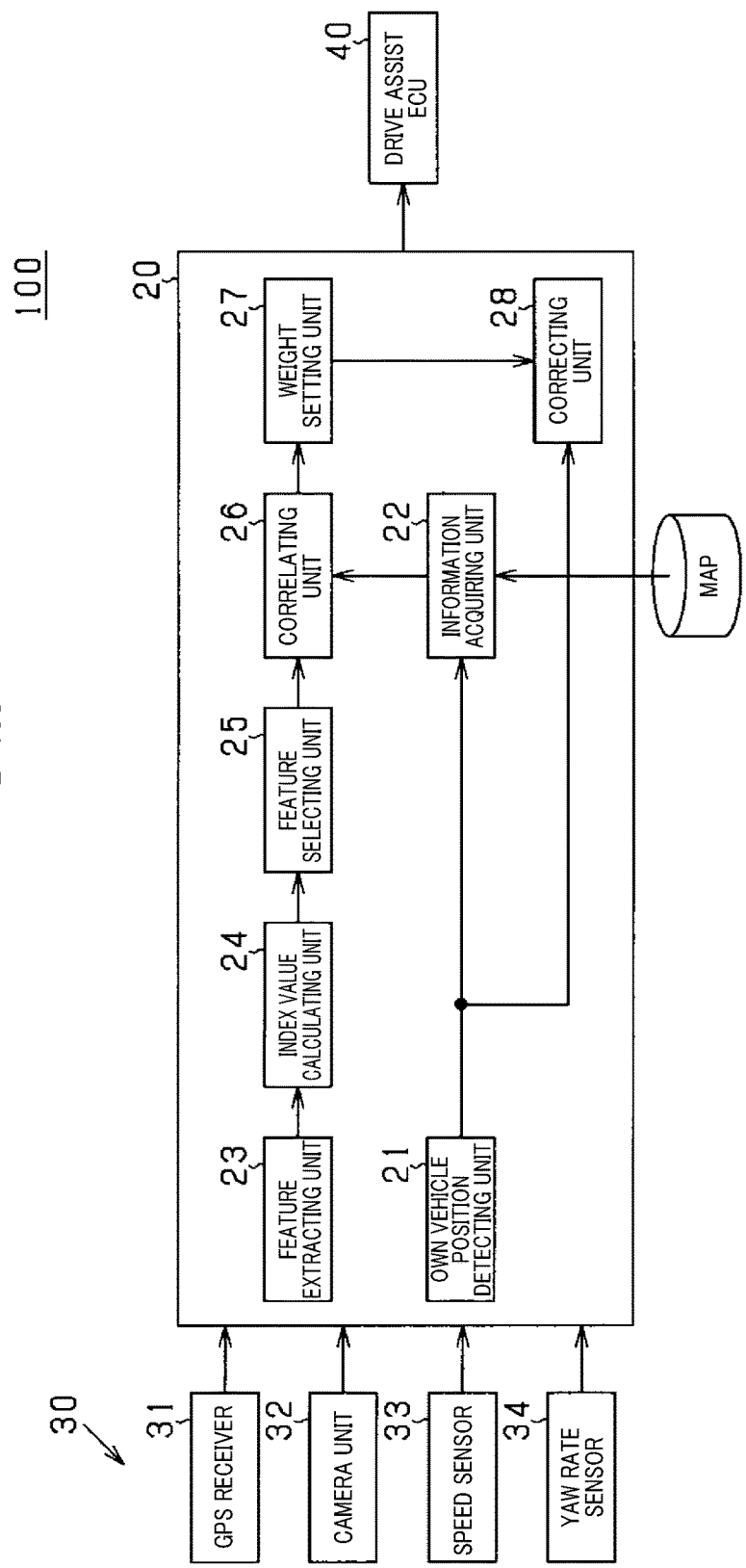
FIG. 1 is a block diagram showing a configuration of a vehicle control apparatus.

With reference to the drawings, embodiments of a position identifying apparatus for own vehicle (hereinafter referred to as position identifying apparatus), and a position identifying method for own vehicle (hereinafter referred to as position identifying method) according to the present disclosure will be described. In the drawings, the same reference signs are applied to mutually identical portions or equivalent portions among embodiments, and the same explanation will be applied to the identical portions.

First Embodiment

The position identifying apparatus is configured as a part of a vehicle control unit that controls the vehicle. The vehicle control unit controls traveling of the own vehicle by using a position of the own vehicle calculated by the position identifying apparatus. In the embodiments, a ground object is utilized for an installed object used for recognizing the position on the road, and an indication on the road surface. Specifically, the ground object is utilized as a concept including a signal sign, a curb stone, a sign and a road sign (white lane marking, pedestrian crossing, speed limit sign).

With reference to FIG. 1, a configuration of a vehicle control unit 100 according to the present embodiment will be described. The vehicle control unit 100 is provided with sensor 30 adapted for various sensing objects, position identifying ECU 20 and a drive assist ECU 40. In FIG. 1, the position identifying ECU 20 serves as a position identifying apparatus.

The sensor 30 is provided with a GPS receiver 31, a camera unit 32, a speed sensor 33, and a yaw rate sensor 34.

The GPS receiver 31 serves as a part of known global navigation satellite system (GNSS), where electromagnetic waves transmitted from the satellite are received as GPS (global positioning system) information. The GPS information includes a position of the satellite and time at which electromagnetic waves are transmitted. The GPS receiver 31 calculates a distance between the satellite and the own vehicle based on a difference between a receiving time at which the GPS information is received and a transmitting time included in the GPS information. Then, the GPS receiver 31 transmits the distance to the satellite and the position of the satellite to the position identifying ECU 20.

The camera unit 32 serves as feature detecting unit to capture ahead of the own vehicle in the running direction thereof. The camera unit 32 is configured of a CCD camera, a CMOS image sensor, a near infrared ray camera or the like. The camera 32 is mounted on the own vehicle such that the imaging direction thereof is set to face ahead of the vehicle. Specifically, the camera unit 32 is attached to a center location in the vehicle width direction of the own vehicle, for example to the rear view mirror, and captures an area spread in a predetermined angle range of ahead of vehicle. In the case where the camera unit 32 is a stereo camera, three-dimensional position of an object can be detected.

The speed sensor 33 is provided at a rotational shaft that transmits the power to the wheels of the own vehicle, and detects the travelling speed of the own vehicle based on the rotation frequency of the rotational shaft. The yaw rate sensor 34 detects a yaw rate produced in the own vehicle, that is, an angular velocity around the vehicle center of gravity.

The position identifying ECU 20 is configured of a computer provided with CPU, ROM and RAM. The CPU executes the program stored in the memory, thereby serving as respective functions shown in FIG. 1.

Figure 2:
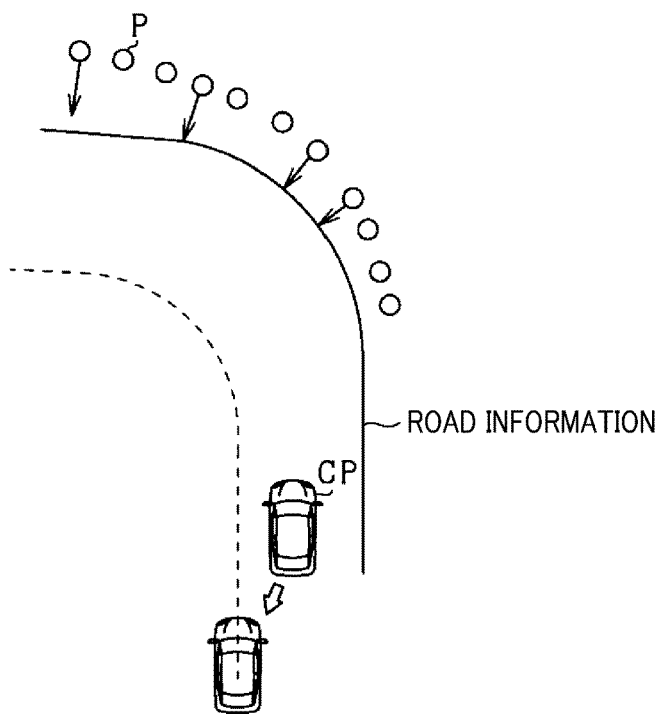
FIG. 2 is an explanatory diagram showing a correction of an own vehicle position CP performed by a position identifying ECU.

The position identifying ECU 20 detects features of ground object existing around the own vehicle and corrects the own vehicle position CP based on the position of the features on the map. As shown in FIG. 2, the position identifying ECU 20 detects the own vehicle position CP which is a position of the own vehicle on the map. Next, road information surrounding the own vehicle is acquired from the map. The road information includes position and shape of the ground object surrounding the own vehicle. Subsequently, positions of the features are detected based on captured images of surroundings of the own vehicle. In FIG. 2, edge points P representing position of the road side wall as the feature are utilized. Then, the position identifying ECU 20 corrects the own vehicle position CP by using the position of the features and the position of features on the map.

The drive assist ECU 40 controls traveling of the own vehicle based on the own vehicle position CP identified by the position identifying ECU 20. For example, the drive assist ECU 40 estimates a future position of the own vehicle based on the own vehicle position CP, the travelling speed and the yaw rate, and determines whether or not the own vehicle departs from the lane marking based on the estimated future position and recognition result of the road. For example, when the drive assist ECU 40 determines that the own vehicle is likely to depart from the lane marking and if the drive assist ECU 40 has a warning function, the drive assist ECU 40 indicates a warning on the display provided in the own vehicle or generates a warning sound to output from the speaker in the own vehicle. Also, if the drive assist ECU 40 has a drive support function, when determining that the own vehicle is likely to depart from the lane, a steering force is applied to the steering apparatus.

Many vehicles and signboards are present on a road where the vehicle runs, and these vehicles and the signboards are not recorded on the map. Hence, the position identifying ECU 20 sometimes erroneously detects these objects as the features recorded on the map. For example, in an example of FIG. 2, when a vehicle is stopped near the road-side wall, the position identifying ECU 20 may erroneously detect the vehicle as a part of the road-side wall. On the other hand, in order to correct the position of the own vehicle accurately, a number of feature points used for correction may preferably be used. Accordingly, in the case where features are not appropriately distinguished into features used for correction and other features, the number of feature points are decreased so that the own vehicle position may not be accurately corrected.

The position identifying ECU 20 uses features of ground object which will potentially move with high probability for positional correction of the own vehicle, thereby reducing a decrease of the correction accuracy. As a result, suitable positional correction of the own vehicle can be performed.

Referring back to FIG. 1, an own vehicle position detecting unit 21 detects own vehicle position CP on the map by using a map matching process. The map matching process matches a position of the own vehicle with a position on the road recorded on the map, based on the result of the positioning of the own vehicle and past travelling route of the own vehicle.

An information acquiring unit 22 acquires road information surrounding the own vehicle based on the own vehicle position CP. The map is composed of data in which road information showing features of ground objects existing around the own vehicle position CP. The map is stored in a memory included in the position identifying ECU 20. Further, the position identifying ECU 20 may acquire the map from a server (not shown) via the network.

Figure 3:
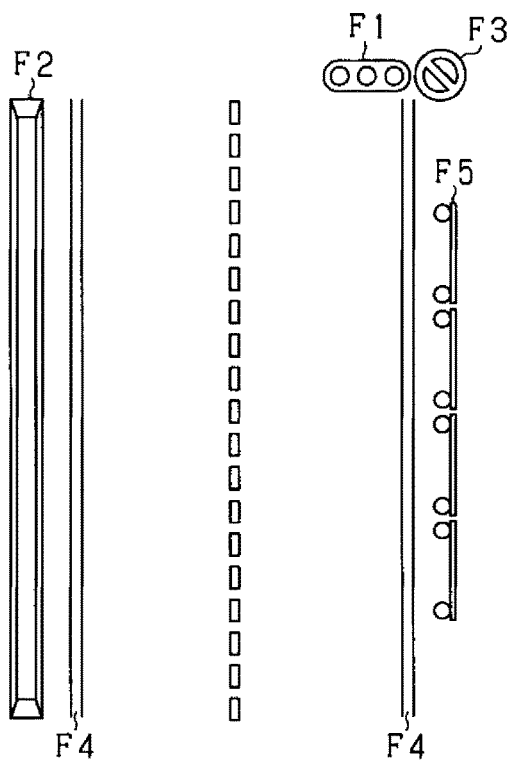
FIG. 3 is a diagram illustrating a map.

The map includes, as road information, shape information indicating a shape and a position (latitude and longitude) of ground object on the road and attribute information recorded being associated with the shape information. In FIG. 3, objects recorded on the map are illustrated, including a traffic signal F1, a curb stone F2, a sign F3, a road sign F4 on the road surface, and a guardrail F5. The shape information is used for identifying shapes of the ground object and is configured of a location, an edge and a surface for representative points. For example, the shape information of the curb stone F2 includes respective representative points in the longitudinal direction of the curb stone F2, and information indicating shape of respective pieces. Also, the attribute information includes information such as identifiers (name) that distinguish each of the ground objects.

The map may record nodes representing connecting points of the roads, and links that connect nodes. In this case, the map includes positions on the map between the nodes and the link, information representing a connection relationship between the nodes and the link and features of ground object existing around the nodes or the links, which are recorded therein as being correlated to each other.

A feature extracting unit 23 extracts edge points P of ground object existing around the own vehicle, based on the image by the camera unit 32. For example, the feature extracting unit 23 uses a known filter for the captured image so as to extract pixels having a concentration gradient larger than or equal to a predetermined value, as the edge points P.

An index value calculating unit 24 calculates, for the extracted edge points P, an index value representing a likelihood of a stationary object. The index value representing a likelihood of a stationary object indicates whether or not the edge points P belong to a stationary object. According to the present embodiment, the larger the index value, the higher the probability of a stationary object for the edge points P.

A feature selecting unit 25 selects edge point candidates OP from the detected edge points P, based on the index value representing likelihood of a stationary object. The edge point candidates OP are edge points P used for correcting the own vehicle position CP, among the extracted edge points P extracted by the feature extracting unit 23. Hence, according to the present embodiment, the edge point candidates OP are feature candidates.

A correlating unit 26 correlates the edge point candidates OP with the road information acquired by the information acquiring unit 22. The correlating unit 26 correlates the edge point candidates OP with positions of the ground object on the map acquired from the road information.

A weight setting unit 27 sets weight α to the edge point candidates OP correlated with the position of the ground objects, where the weight α is used for correcting the own vehicle position. The weight α is set between 0 and 1, for example. It should be noted that the edge point candidates OP, where the weight α is set to 0 are not used for correcting the own vehicle position CP.

The correction unit 28 corrects the own vehicle position CP using the weight α. Specifically, the position of the own vehicle is changed on the map, based on positions of the ground objects determined by the edge point candidates OP and positions of the ground object on the map, whereby the own vehicle position CP is corrected. Also, in the correction of the own vehicle, the own vehicle position CP is corrected with prioritizing edge point candidates OP having larger weight α.

Figure 4:
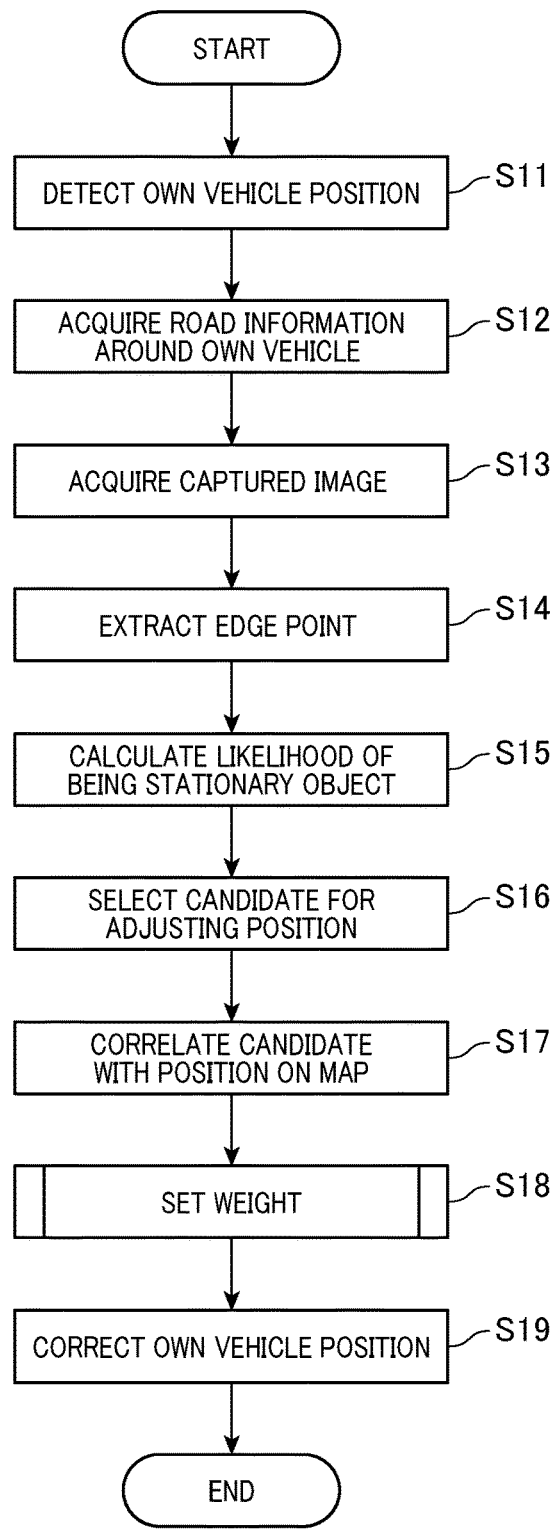
FIG. 4 is a flowchart showing an identifying process of the own vehicle position CP performed by a position identifying ECU.

With reference to FIG. 4, a correction process of the own vehicle position CP performed by the position identifying ECU 20 will be described. In the following, a case will be described, in which the own vehicle position CP is corrected using the curb stone F2. The processes shown in FIG. 4 are executed at a predetermined period by the position identifying ECU 20.

At step S11, the process detects the own vehicle position CP based on the GPS information received by the GPS received 31. The own vehicle position CP is detected by using a known map matching. The step S11 serves as an own vehicle position detecting process.

At step S12, the process acquires road information around the own vehicle position CP. The position identifying ECU 20 acquires shapes of ground object existing within a predetermined distance relative the own vehicle position CP as a center position. Step S12 serves as information acquiring process.

At step S13, the process acquires captured image from the camera unit 32. At step S14, edge points P are acquired from the captured image. The step S14 serves as a feature extracting process.

Figure 5A:
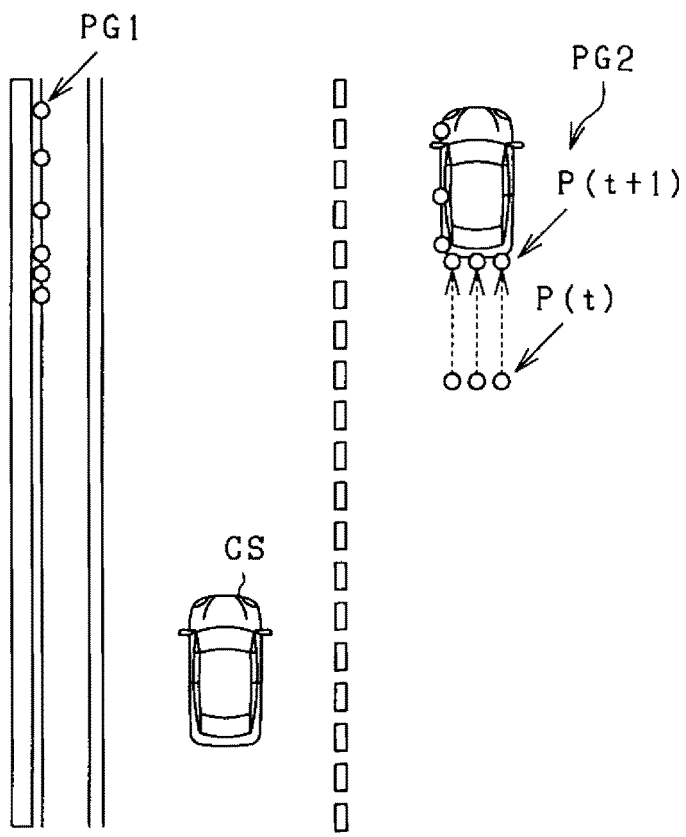
FIGS. 5A and 5B are diagrams showing a process executed at step S15.

Step S15 calculates an index value representing likelihood of being the stationary object of the edge points P. FIG. 5A is a bird's eye view of the own vehicle CS from the above, in which edge point group PG1 in the left side of FIG. 5A and the edge point group PG2 in the right side of FIG. 5A are extracted by the process of step S14. In FIG. 5A, when it is assumed that the edge point group PG2 belong a moving object such as a vehicle, the edge points group PG2 may be significantly varied with time. In FIG. 5A, edge point group PG2 includes positions of the edge points P at time t and positions of the edge points P at time t+1. Therefore, the position identifying ECU 20 outputs smaller index values for the edge points P having large positional change with time, than the edge points P having small positional change with time.

Figure 5B:
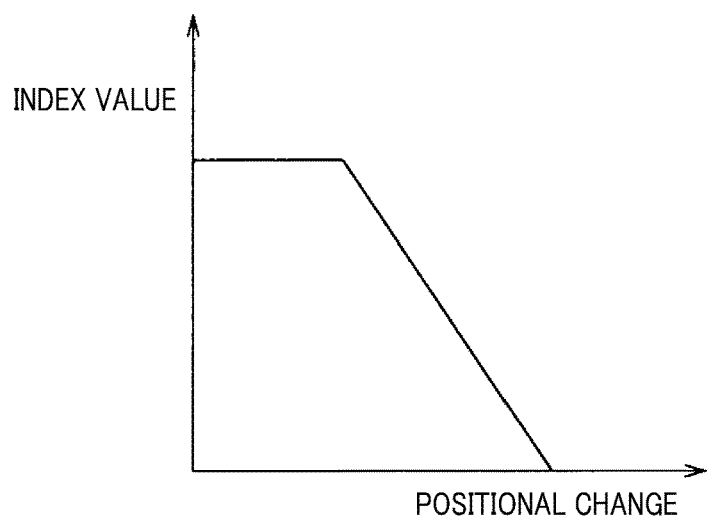

For example, the position identifying ECU 20 calculates a difference between the position of the edge points P (t) extracted from the captured image at time t, and the position of the edge points P (t+1) extracted from the captured image at time t+1, to be a positional change with time. Then, the position identifying ECU 20 acquires an index value representing likelihood of the stationary object at each edge point P, from the map in which a relationship between the calculated positional change with time and the index value are recorded. For example, according to a map shown in FIG. 5B, a relationship between the index value and the positional change is shown, in which the larger the positional change of edge points P, the lower the index value. The step S15 serves as an index value calculating process.

At step S16, the process selects edge point candidates OP used for correcting the own vehicle position CP based on the index value calculated at step S15. According to the present embodiment, the position identifying ECU 20 selects edge points having index value larger than or equal to threshold Th1 to be edge point candidates OP. As a result of processing at step S16, features having low likelihood of the stationary object are excluded from objects used for correcting the own vehicle position CP. The step S16 serves as a feature selection process.

At step S17, the process correlates the edge point candidates OP with the road information. The position identifying ECU 20 correlates the edge point candidates OP with representative positions of ground object existing around the own vehicle position CP acquired at step S12. The step S17 serves as a correlating process.

At step S18, the process sets weight α used for correcting the own vehicle position CP. In this first embodiment, the weight α is set based on a distance L from the edge point candidates OP to a position of the ground object in a horizontal direction of the vehicle. The step S18 serves as a weight setting process.

Figure 6:
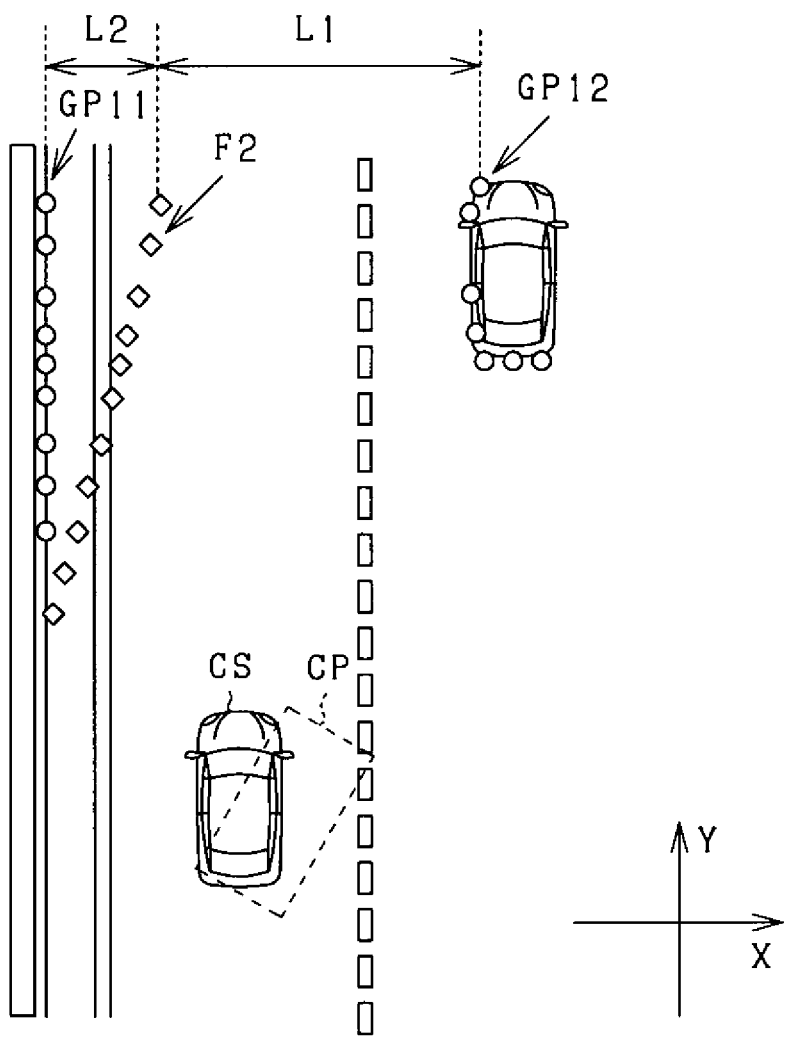
FIG. 6 is a bird's eye view showing the own vehicle from the above.

In FIG. 6, a positional relationship is illustrated when projecting the positions of the curb stone F2 and the own vehicle position CP, on the bird's eye view when viewing the own vehicle CS from the above. The position of the own vehicle on the map is shown with a dotted line, in which the positional shift is confirmed between the own vehicle CS and the own vehicle position CP. In the vicinity of the own vehicle CS, edge point candidate group GP11 in the left side of FIG. 6 is detected and edge point candidate group GP12 in the right side of FIG. 6 is detected. Here, the edge point candidate group having large distance from a position of the ground object on the map may have low probability of the ground object recorded in the map. In FIG. 6, the maximum distance L1 from the edge point candidate group GP 12 to the curb stone F2 recorded in the map is larger than the maximum distance L2 from the edge point candidate GP11 to the curb stone F2 recorded in the map. Hence a probability of the edge point candidate group GP12 being the edge point P of the curb stone F2 becomes low. Accordingly, at step S18, the weight α is set based on the distance L in the horizontal direction of the vehicle between the edge point candidates OP and the ground object recorded in the map.

Figure 7A:
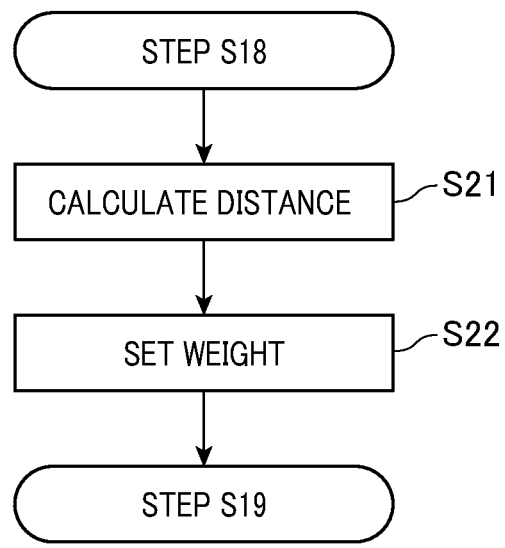
FIGS. 7A and 7B are a flowchart and a graph showing a process executed at step S18.

FIG. 7A is a flowchart showing a detailed process of step S18. At step S21, a distance L between the edge point candidates OP to the ground object recorded in the map. According to the present embodiment, the distance L is calculated for all edge point candidates OP in the captured image. For example, the identifying ECU 20 calculates, based on the shape of the curb stone F2 acquired from graphic information, the distance L from each edge point candidate Op to the position of the ground object.

Figure 7B:
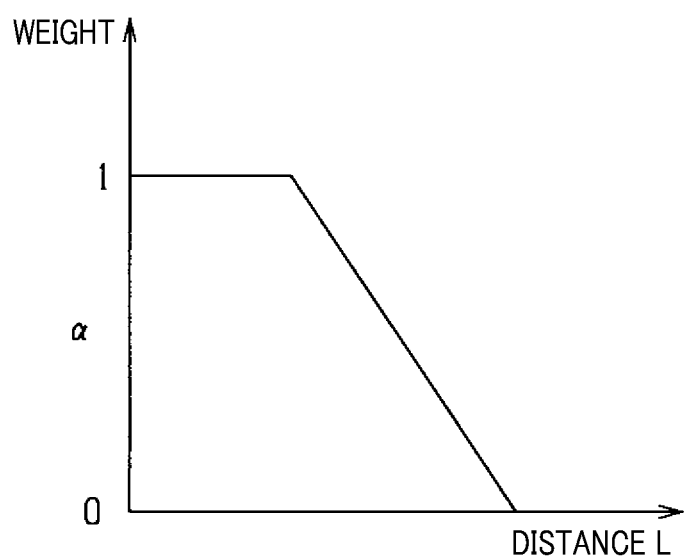

At step S22, the process sets weight α based on the distance L calculated at step S21. For example, the position identifying ECU 20 holds a map that defines a relationship between the distance L and the weight α, by referring the map, the weight α depending on the distance L is acquired. The map shown in FIG. 7B illustrates a relationship between the distance L and the weight α such that the larger the distance L, the lower the weight α. When the process at step S22 is completed, the process proceeds to step S19 shown in FIG. 4.

At step S19, the weights α being set for respective edge points OP are used to correct the own position CP. For example, the position identifying ECU 20 calculates an amount of shift between the position of the ground object detected from the edge point candidates OP and the position of the ground object indicated by the road information. Then, own vehicle position CP detected at step S11 is corrected by using the calculated amount of shift. At this time, the edge point candidates OP having larger weight α are prioritized to be used for the correction of the shift. The step S19 serves as a correction process.

As described, according to the first embodiment, the position identifying ECU 20 selects, as feature candidates, edge points P having an index value larger than or equal to a predetermined likelihood of a stationary object, among ground objects extracted based on the detection information of the camera unit 32. Also, the position identifying ECU 20 sets the weight α of the edge point candidates OP used for correcting the own vehicle position CP, based on the correlation between the edge candidates OP and the road information. The own vehicle position CP is corrected by using the weight α. In this case, the weights α are applied to the edge point candidates OP existing around the own vehicle, considering likelihood of the stationary objects. Accordingly, the position identifying ECU 20 uses objects which will potentially move with high probability for positional correction of the own vehicle, thereby reducing a decrease of the correction accuracy. As a result, suitable positional correction of the own vehicle can be performed.

The identifying ECU 20 calculates a positional change of the features with time, and applies a smaller index value to features having large positional change than features having small positional change. Features which are not recorded in the map may have potentially large movement with time. Therefore, depending on the positional change with time, an index value to be calculated is changed. Thus, according to the above-described configurations, features having large positional change are unlikely to be used for the positional correction of the own vehicle so that the accuracy of the own vehicle position CP after the correction can be enhanced.

The position identifying ECU 20 calculates the distance L defined between the features recorded in the map and the edge point candidates OP, and sets a larger weight α to the edge point candidates having smaller calculated distance L than that of the edge point candidate OP having large distance L. The larger the distance to the edge point P detected from the position of features recorded in the map, the larger the probability that features where the edge point P is detected are not recorded in the map. Hence, the weight α is set depending on the distance to the position on the map from the edge point P. Thus, according to the above-described embodiment, the priority used for correcting the features can be changed considering a different view point, that is, distance from the detected edge point P to the features, whereby the accuracy of the correction to the own vehicle distance can be enhanced.

Second Embodiment

According to the second embodiment, the distance identifying ECU 20 calculates an index value representing likelihood of being stationary object, depending on type of image of the ground objects from which the edge point P are detected. When the type of image for the ground object can be recognized from the captured image, mobile objects such as pedestrians or vehicles are unlikely to be recorded in the map. On the other hand, stationary objects such as a signal sign, a sign, a curb stone and a guardrail are likely to be recorded. Therefore, the index values of the edge points P representing likelihood of being stationary object are changed depending on type of image in the captured image. It should be noted that the vehicle represents a car or a two-wheel vehicle according to the second embodiment. The two wheel vehicle includes a motor cycle or bicycle.

Figure 8A:
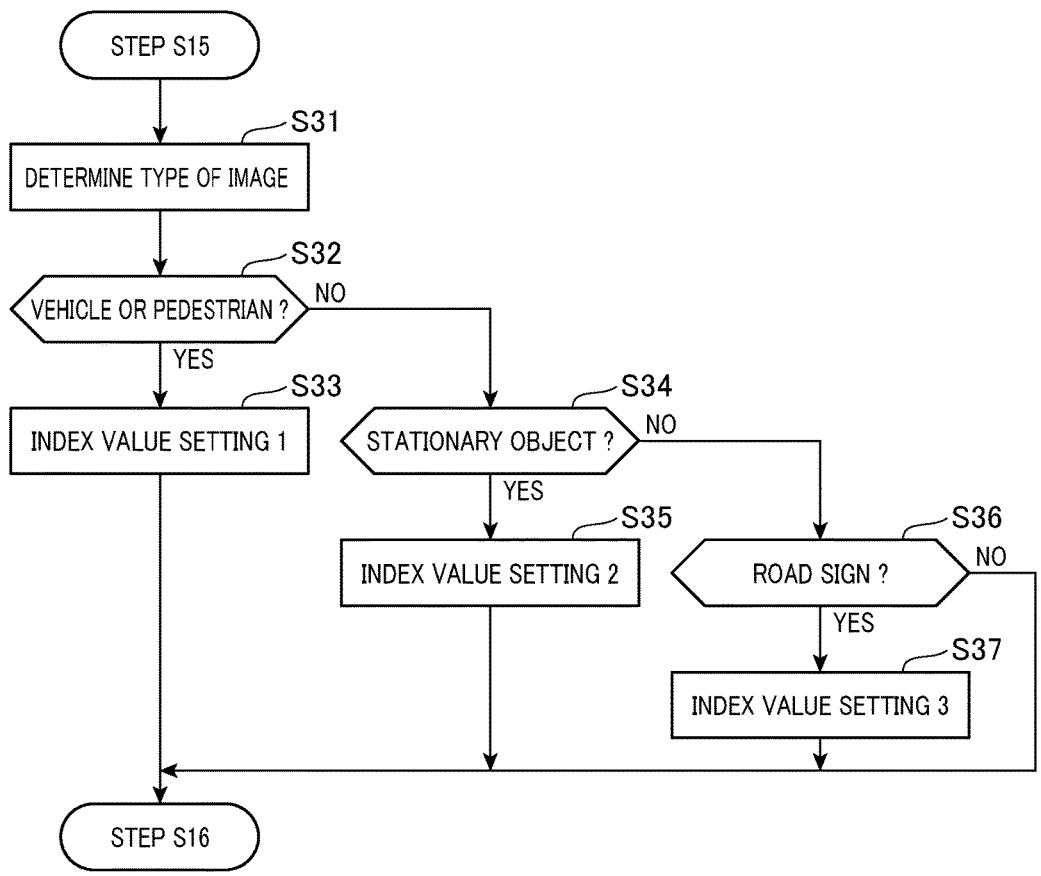
FIGS. 8A and 8B are diagrams showing a calculating method of calculating an index value representing likelihood of a stationary object according to a second embodiment.
Figure 8B:
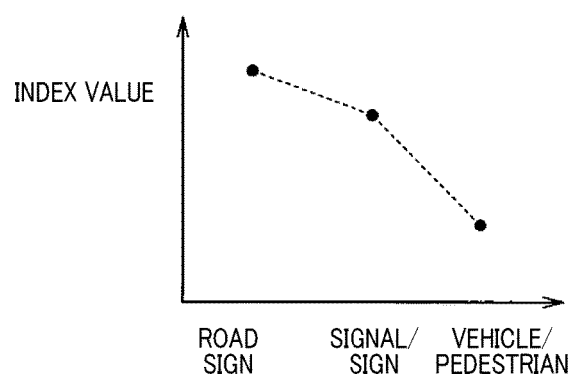

FIG. 8A is a flowchart showing a process executed at step S15 shown in FIG. 4 in the second embodiment. FIG. 8B is a graph showing a relationship between the index value and types of image.

At step S31, the process determines type of image based on the features including edge points P. For example, the position identifying ECU 20 performs a known template matching for features including edge points P extracted at step S14 shown in FIG. 4 so as to determine the type of image. According to the third embodiment, as the type of image, mobile objects, stationary objects and road signs on the road surface are determined. The mobile objects include pedestrians and vehicles and the stationary objects includes a signal signs, signs, curb stones, electric poles, and a guardrails. Roads sign on the road includes a lane marking, a zebra zone, a cross-walk sign, a stop line, and a speed limit sign.

When the type of image is a vehicle or a pedestrian (Step S32: YES), the process sets the index value showing a vehicle or a pedestrian at step S33 (index value setting 1).

When the type of image is neither a vehicle nor a pedestrian (step S32: NO), the process determines whether or not the type of image is a stationary object such as a sign or a signal sign at step S34. When the type of image is a stationary object (step S34: YES), the process sets an index value corresponding to a stationary object (index value setting 2). As shown in FIG. 8B, compared to the index value as a mobile object set at step S33, a larger index value is set at step S35. Steps S31, S32, and S34 correspond to type determination unit.

When the type of image is not stationary object (step S34: NO), the process determines whether or not the type of image is a road sign on the road surface at step S36. When the process determines that the type of image is a road sign (Step S36: YES), the index value is set to indicate the road sign at step S37. As shown in FIG. 8B, larger index value is set at step S37 than the index value of the stationary object set at step S36. This is because, the road sign which is recorded as road information including a position on the road, is used for correcting the own vehicle position CP, thereby accurately correcting the own vehicle position CP.

When the process determines that the type of image is not road sign (step S36: NO), the process temporarily terminates the process shown in FIG. 8. Then processes of steps S16 to S19 shown in FIG. 4 are performed, thereby correcting the own vehicle position CP. Step S36 serves as a road sign determination unit.

As described above, according to the second embodiment, the position identifying ECU 20 determines the type of image of ground objects from which the edge points P are extracted based on the captured image around the vehicle captured by the camera unit 32, and calculates an index value for the edge points P determined as a vehicle or a pedestrian, where the index value is smaller than that of edge points which are not determined as a vehicle or a pedestrian. When there is large traffic of vehicles or pedestrians in the vicinity of the road, the vehicles or pedestrians may be erroneously detected as features recorded in the map. Hence, a smaller index value is applied to features determined as a vehicle or a pedestrian, compared to features not determined as the vehicle or the pedestrian. Thus, according to the above-described configurations, position of the own vehicle can be appropriately corrected even in a road with heavy traffic of vehicles and pedestrians.

When the process determines ground objects as a road sign on the road surface, where edge points P are extracted from the ground object based on the captured image around the vehicle, the position identifying ECU 20 calculates larger index value compared to a case where the ground object is not determined as a road sign. The importance of using the road sign for correcting the own vehicle position is high, since road signs on the road can be used for accurately determining the position of the road where vehicle runs. Hence, type of image of the features is detected from the captured image, and larger index value is applied to features of which the type of image is determined as a road sign on the road. Thus, according to the above-described configuration, the priority used for the correction is set to high for the features showing position of the road. Therefore, a correction accuracy of the own vehicle position can be enhanced.

Third Embodiment

According to the third embodiment, the weight $\alpha$ is set based on a similarity between the shape of feature acquired from the road information and approximate shape of the features composed of edge point candidates OP.

Figure 9:
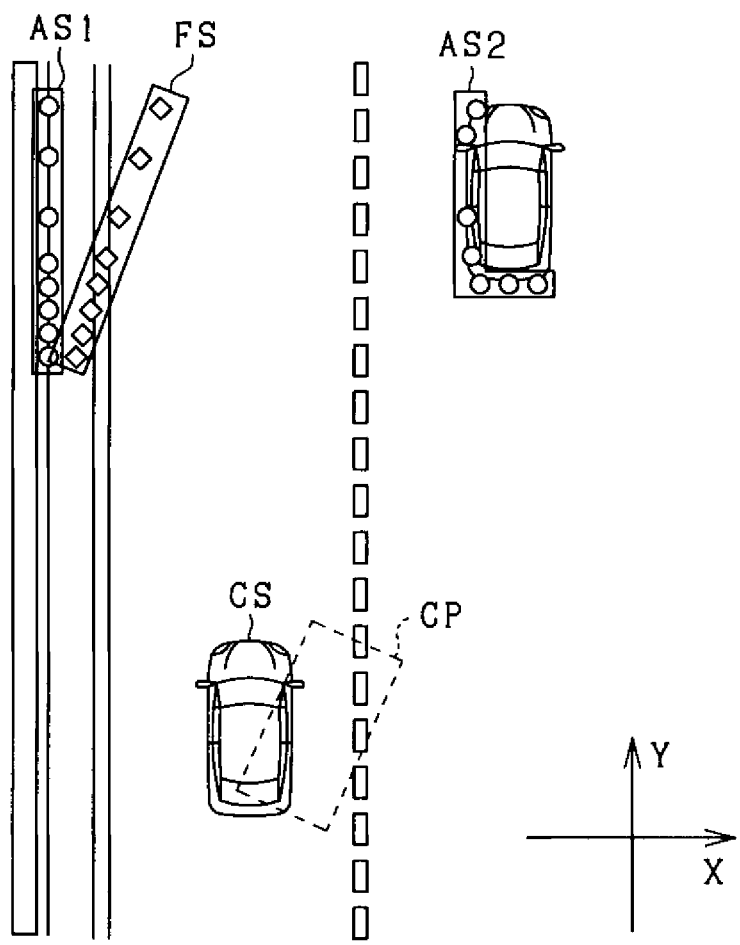
FIG. 9 is a bird's eye view showing the own vehicle from the above.
Figure 10A:
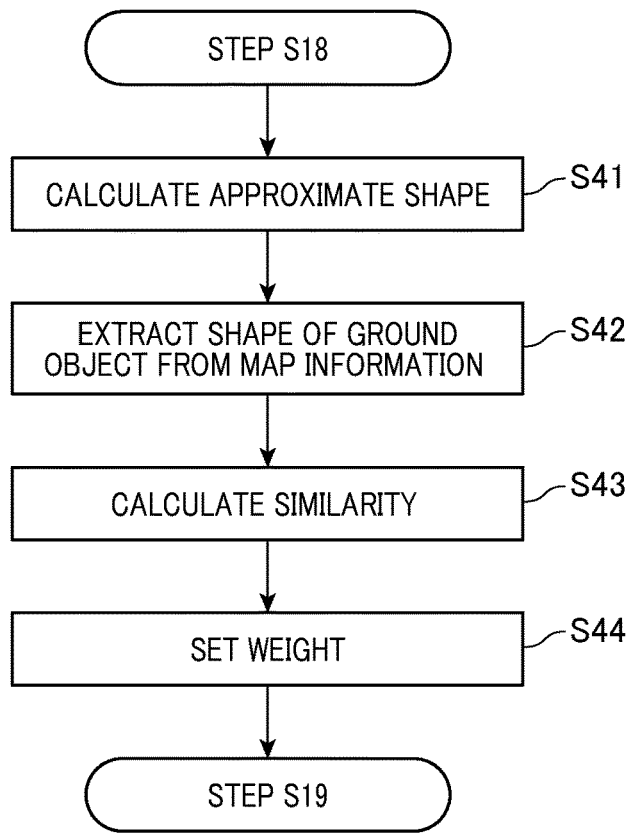
FIGS. 10A and 10B are a flowchart and a graph showing a detailed process executed at step S18 shown in FIG. 4.
Figure 10B:
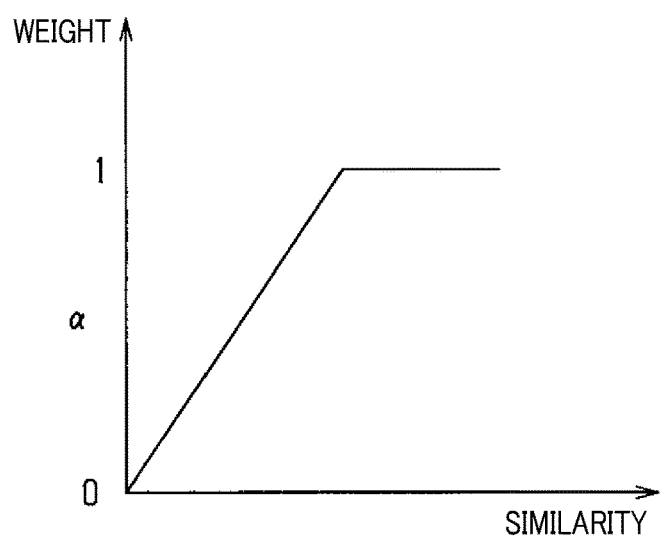

FIG. 9 is a graph showing a positional relationship between the curb stone F2 and the own vehicle position CP when these positions in the map are projected on the bird's eye view when the own vehicle is viewed from the above. Also, FIGS. 10A and 10B are a flowchart and a graph according to the third embodiment, showing a detailed process executed at step S18 shown in FIG. 4.

At step S41, the process calculates an approximate shape of a ground object from the edge point candidates OP. For example, the position identifying ECU 20 acquires a shape indicated by edge point candidates OP by using a known Hough transform. As shown in FIG. 9, appropriate shape AS1 of an edge point candidate group is illustrated in the left side of FIG. 9, and appropriate shape AS2 of an edge point candidate group is illustrated in the right side of FIG. 9.

At step S42, the process extracts the shape of ground object recorded in the map. For example, the position identifying ECU 20 extracts the shape of the ground object from the shape information, based on vector data showing the ground object. In FIG. 9, a shape FS of the curb stone F2 is extracted.

At step S43, the process calculates a similarity between the approximate shape calculated at step S41 and the shape of the ground object extracted at step S42. For example, the position identifying ECU 20 calculates a similarity based on conformity or disconformity in the features of respective shapes. According to an example shown in FIG. 9, the similarity of the approximate shape AS1 in the left side of FIG. 9 is higher than the similarity of the approximate shape AS2 in the right side of FIG. 9.

At step S44, the weight $\alpha$ is set based on the similarity calculated at step S43. For example, the position identification ECU 20 stores a map defining a correspondence between the similarity and the weight $\alpha$ and acquires the weight $\alpha$ corresponding to the similarity by referring to the map. In the map shown in FIG. 10B, values are set such that the larger the similarity, the larger the weight $\alpha$.

When the process of step S44 is completed, the process which is shown in FIG. 10A is temporarily terminated. Then, the own position CP is corrected by executing the process of step S19 shown in FIG. 4.

As described above, according to the third embodiment, the position identifying ECU 20 acquires a shape of the ground object around the own vehicle, as road information. Then, the process sets a larger weight $\alpha$ to feature candidates compared to a case where the similarity is low, when the similarity is large between the approximate shape of the ground object approximated by the edge point candidates OP and the shape of the ground object acquired from the road information. The process can calculate an approximate shape of the outline of features by using a distribution of edge points P. In the case where the shape of the ground object is recorded in the map, depending on the similarity between the calculated approximate shape of the ground object and the shape recorded in the map, the process determines whether or not the ground object is recorded in the map. According to the above-described configuration, the weight α can be used for the correction with a different view point of the shape so that correction accuracy of the own vehicle position can be enhanced.

Fourth Embodiment

According to the fourth embodiment, the position identifying ECU 20 divides feature candidates based on distance in the running direction of the vehicle, and corrects the own vehicle position CP by using the feature candidates included in any divided feature candidates.

Figure 11A:
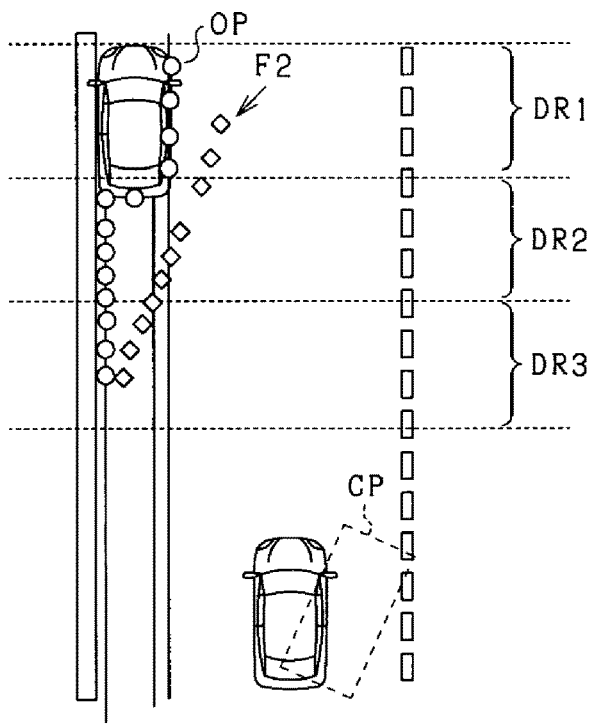
FIGS. 11A and 11B are an explanatory diagram showing a correction of the own vehicle position CP according to a fourth embodiment.
Figure 11B:
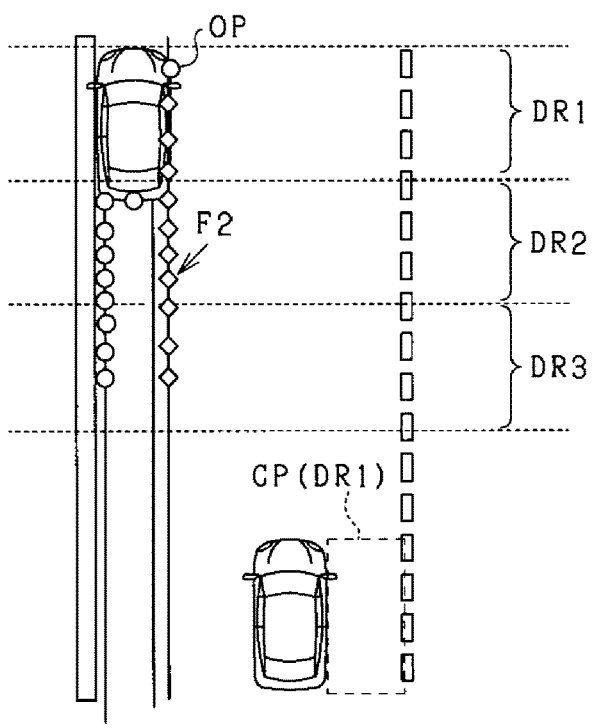
Figure 12A:
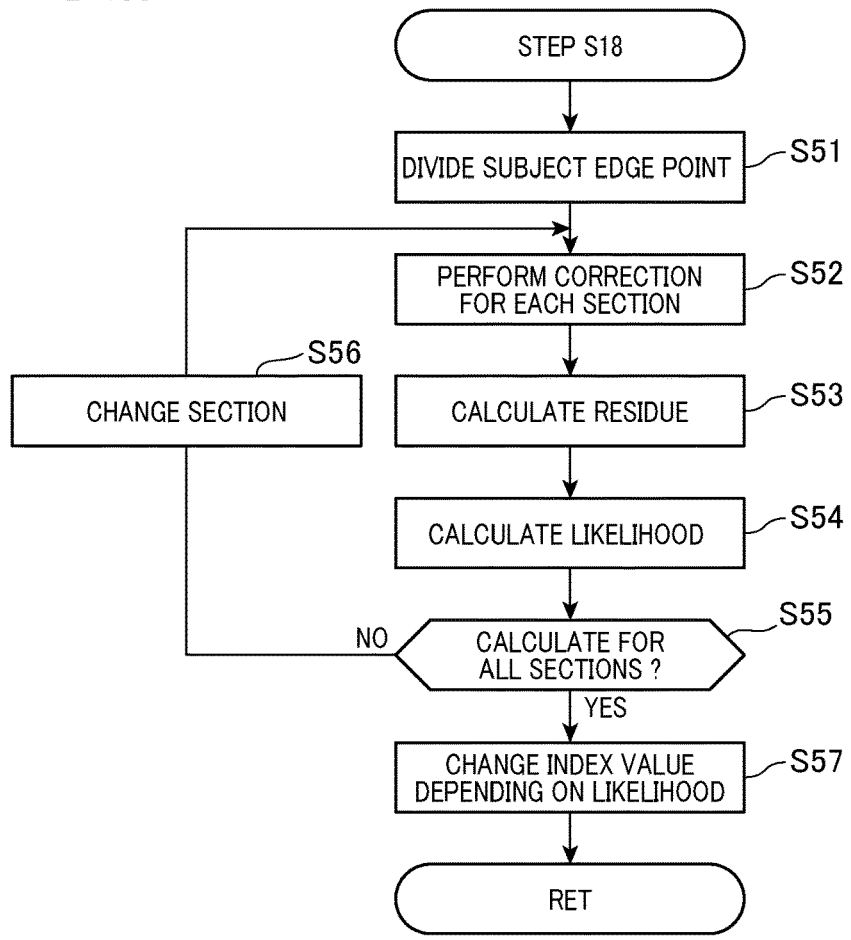
FIGS. 12A and 12B are a flowchart and a graph showing a process executed at step S18 shown in FIG. 4 according to the fourth embodiment.
Figure 12B:
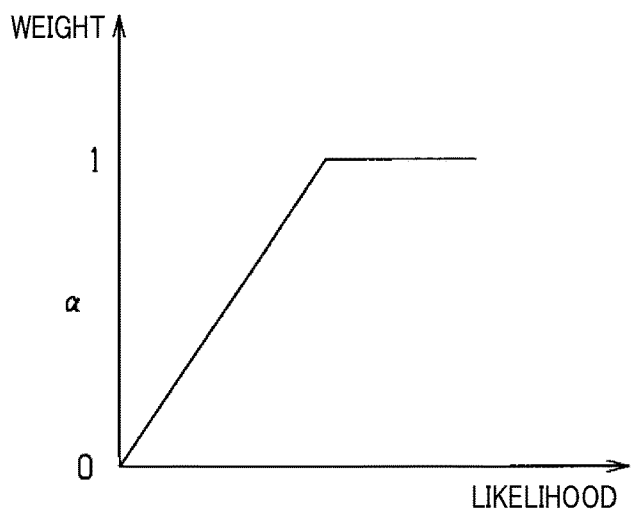

FIGS. 11A and 11B are an explanatory diagram showing a correction of the own vehicle position CP according to a fourth embodiment. FIGS. 12A and 12B are a flowchart and a graph showing a process executed at step S18 shown in FIG. 4 according to the fourth embodiment.

At step S51, captured image is divided depending on the distance from the vicinity of the own vehicle. In FIG. 11A, the lane is divided into sections DR1 to DR3 in the running direction of the own vehicle.

At step S52, the own vehicle position CP after correction is calculated using edge point candidates OP included in the divided lane. According to an example shown in FIGS. 11A and 11B, the position identifying ECU 20 calculates the own vehicle position CP after the correction, by using the edge point candidates OP included in the section DR1.

At step S53, the process calculates a residue between the edge point candidates OP using the own vehicle position CP after the correction at step S52, and the positions on the map. First, the position identifying ECU 20 again sets the position of the edge point candidates OP based on the own vehicle position CP after the correction at step S52. The position of the edge point candidates OP is again set relative to the own vehicle position CP after the correction at step S52, based on a distance from an own vehicle position CP to the edge point candidates OP. For the distance from the own vehicle position CP to the edge point candidates OP, detected positions of the edge point candidates OP can be used. Then, the process calculates deviations between positions of re-set edge point candidates OP and the positions of the ground object in the map. As a result, the process calculates an average value of these deviations to be the residue.

As shown in FIG. 11A, a vehicle is located near the curb stone in the section DR1, in which the vehicle is not recorded in the map, and the position of the vehicle is extracted as the edge point candidates OP. According to FIG. 11B, the own vehicle position CP (DR1) is shown, after the correction using the edge point candidates OP in the section DR1. The own vehicle position CP (DR1) is shown after the correction has been corrected to minimize the deviation between the edge point candidate OP in the section DR1 and the position of the curb stone F2 on the map, and the deviations in other sections DR2 and DR3 have large values.

At step S54, based on the residue calculated at step S53, likelihood of the own vehicle CP which is corrected by the edge points P in respective sections. The likelihood represents a degree of certainty of the positional accuracy of the own vehicle position CP after the correction such that the larger the value, the higher the positional accuracy of the own vehicle position CP after the correction. For example, according to the embodiment, the process calculates the likelihood such that the smaller the residue, the larger the likelihood. Step S53 and step S54 serve as likelihood calculation unit. In FIG. 11B, since the residue in the sections DR1 to DR3 becomes large, the likelihood of the own vehicle position CP after the correction in the section DR1 becomes small.

At step S55, the process determines whether or not likelihood has been calculated for all sections set at step S51. When the likelihood has not been calculated for all sections (step S55: NO), the process changes sections for calculating the likelihood at step S56. For example, when the likelihood is calculated for the section DR1, subject section is changed to DR2 from DR1. Then, processes of step S52 to S54 are performed for the changed section.

When the likelihood is calculated for all sections (step S55: YES), at step S57, the weight α of edge point candidates OP in the respective sections are changed based on the likelihood. For example, the position identifying ECU 20 holds a map that defines a relationship between the likelihood and the weight α, by referring the map, the weight α is changed depending on the likelihood. In the map shown in FIG. 12B, values are set such that larger the likelihood, the larger the weight α.

When the process of step S57 is completed, the process proceeds to step S19 shown in FIG. 4 and corrects the own vehicle position CP. At this time, the priority used for correcting each edge point OP is changed based on the weight α which is changed at step S57.

As described above, according to the fourth embodiment, the position identifying ECU 20 divides the edge point candidates OP into sections depending on the distance from the own vehicle, and corrects the own vehicle position for each section. Then, the process calculates a likelihood representing a degree of certainty of the own vehicle position after the correction for each section, and sets the weight α of the section corresponding to the own vehicle position having high likelihood, to be smaller than that of a section corresponding to the own vehicle position having low likelihood. In a part of area, edge points which are recorded in the map and edge points which are not recorded in the map are sometimes overlapped. In this case, positional accuracy of the own vehicle position CP after the correction becomes low, where the correction has been made based on the edge point candidates OP detected in the section. Accordingly, a likelihood representing a degree of certainty of the own vehicle position CP after the correction is calculated for each section determined depending on distances from the own vehicle, and sets the weight based on the calculated likelihood. According to the above-described configuration, edge points P corresponding to sections where the positional accuracy is deteriorated, can be excluded. Hence, the own vehicle position can appropriately corrected.

Other Embodiments

As an example, a camera unit is used as a feature detecting unit. However, as the feature detecting unit, a laser sensor or a radar sensor which use electromagnetic waves to detect objects may be used.

As an example, a curb stone is used as a feature for correcting the own vehicle position. However, as a feature, a road sign on the road surface such as white lane marking, a sign, a guardrail and a road-side wall can be used as an own vehicle position.

At step S11, instead of using GPS information in the detection of the own vehicle position CP, a value where the output of the speed sensor 33 is integrated may be employed. Also, both of the GPS information and integrated value of the speed sensor 33 may be used.

What is claimed is:

1. A position identifying apparatus comprising:
   a position detecting unit that detects a position of an own vehicle on a map by using a map matching process;
   an information acquiring unit that acquires, from the map, road information surrounding the own vehicle based on the position of the own vehicle detected by the position detecting unit;
   a feature extracting unit that extracts features of ground object existing around the own vehicle, based on an output of a feature detecting unit mounted on the own vehicle;
   an index value calculating unit that calculates an index value representing a likelihood of a stationary object for the features extracted by the feature extracting unit;
   a feature selecting unit that selects feature candidates from among the features having an index value larger than or equal to a predetermined likelihood of the stationary object;
   a correlating unit that correlates the feature candidates with the road information acquired by the information acquiring unit;
   a weight setting unit that sets weights for feature candidates correlated with the road information, the weight being used for correcting the position of the own vehicle; and
   wherein the index value calculating unit is configured to calculate a positional change of the feature, which changes with time, and configured to set a smaller index value to a feature having a large positional change relative to an index value calculated for a feature having a small positional change.

2. A position identifying apparatus comprising:
   a position detecting unit that detects a position of an own vehicle on a map by using a map matching process;
   an information acquiring unit that acquires, from the map, road information surrounding the own vehicle based on the position of the own vehicle detected by the position detecting unit;
   a feature extracting unit that extracts features of a ground object existing around the own vehicle, based on an output of a feature detecting unit mounted on the own vehicle;
   an index value calculating unit that calculates an index value representing a likelihood of a stationary object for the features extracted by the feature extracting unit;
   a feature selecting unit that selects feature candidates from among the features having an index value larger than or equal to a predetermined likelihood of the stationary object;
   a correlating unit that correlates the feature candidates with the road information acquired by the information acquiring unit;
   a weight setting unit that sets weights for feature candidates correlated with the road information, the weight being used for correcting the position of the own vehicle; and
   a correcting unit that corrects the position of the own vehicle using the weights;
   wherein the apparatus includes a type determination unit that determines the feature extracted by the feature extracting unit; and
   wherein the index value calculating unit is configured to set a smaller index value to a feature determined as either a vehicle or a pedestrian, wherein the smaller index value is smaller than an index value for a feature not determined as either a vehicle or a pedestrian.

3. The position identifying apparatus according to claim 1, wherein
   the apparatus includes a road sign determination unit that determines whether or not the feature is a road sign on a road surface;
   the index value calculating unit is configured to set a larger index value to a feature determined as the road sign on the road surface, wherein the larger index value is larger than an index value for a feature not determined as the road sign.

4. The position identifying apparatus according to claim 1, wherein
   the information acquiring unit is configured to acquire a position of the feature on the map as the road information; and
   the weight setting unit is configured to calculate a distance from a position of the feature candidate to the feature on the map, and configured to set a larger weight for a feature having a small distance from a position of the feature candidate to the feature on the map relative to a weight set for a feature having a large distance from a position of the feature candidate to the feature on the map.

5. The position identifying apparatus according to claim 1, wherein
   the information acquiring unit is configured to acquire a shape of the feature around the vehicle; and
   the weight setting unit is configured to calculate a similarity between an approximate shape of the feature candidate and a shape of the feature acquired by the information acquiring unit, and configured to set a larger weight for a feature candidate in which the similarity is large relative to a weight set for a feature candidate in which the similarity is small.

6. The position identifying apparatus according to claim 1, wherein
   the correcting unit is configured to divide the feature candidates based on distance from the own vehicle, and correct the position of the own vehicle;
   the weight setting means is configured to calculate a likelihood representing a degree of certainty of the position of the own vehicle after the correction in each section, and configured to set a smaller weight to a section corresponding to a position of the own vehicle having a high likelihood relative to a weight set to a section corresponding to a position of the own vehicle having a low likelihood.

7. A position identifying method comprising:
   detecting a position of an own vehicle on a map by using a map matching process;
   acquiring, from the map, a road information surrounding the own vehicle based on the position of the own vehicle detected;
   extracting features of a ground object existing around the own vehicle, based on an output of a feature detecting unit mounted on the own vehicle;
   calculating an index value representing a likelihood of a stationary object for the features extracted;
   calculating a positional change of the feature, which changes with time;
   setting a smaller index value to a feature having a large positional change relative to an index value calculated for a feature having a small positional change;

selecting feature candidates from among the features having an index value larger than or equal to a predetermined likelihood of the stationary object, correlating the feature candidates with the road information acquired by the information acquiring unit;

setting weights for the feature candidates correlated with the road information, the weight being used for correcting the position of the own vehicle; and correcting the position of the own vehicle using the weights.

* * * * *